United States Patent
Bult et al.

(10) Patent No.: US 10,521,981 B2
(45) Date of Patent: Dec. 31, 2019

(54) VEHICLE WASH ASSESSMENT

(71) Applicant: GE Aviation Systems LLC, Grand Rapids, MI (US)

(72) Inventors: Jeffrey Russell Bult, Grand Rapids, MI (US); Mark Lawrence Darnell, Grand Rapids, MI (US); David Michael Lax, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 100 days.

(21) Appl. No.: 15/614,658

(22) Filed: Jun. 6, 2017

(65) Prior Publication Data
US 2018/0350168 A1 Dec. 6, 2018

(51) Int. Cl.
*G07C 5/08* (2006.01)
*B64F 5/30* (2017.01)
(Continued)

(52) U.S. Cl.
CPC ............ *G07C 5/0808* (2013.01); *B64F 5/30* (2017.01); *G07C 5/006* (2013.01); *G07C 5/008* (2013.01); *G07C 5/0816* (2013.01)

(58) Field of Classification Search
CPC ........ B64D 15/22; B64D 33/00; B64D 47/00; B64D 45/00; B63B 59/06; B63J 2099/008;
(Continued)

(56) References Cited

U.S. PATENT DOCUMENTS 3,648,316 A    3/1972 Habian et al.
4,334,425 A *  6/1982 Crane ................. G01L 3/26
                                                701/99
(Continued)

FOREIGN PATENT DOCUMENTS

CA    2160093 C     3/2007
DE    24 44 743 A1  4/1976
(Continued)

OTHER PUBLICATIONS

Munk, Torben, "Fuel conservation through managing hull resistance", Motorship Propulsion Conference, Copenhagen, Apr. 26, 2006, 10 pages (Year: 2006).*

(Continued)

*Primary Examiner* — Behrang Badii
*Assistant Examiner* — David A Testardi
(74) *Attorney, Agent, or Firm* — Dority & Manning, P.A.

(57) ABSTRACT

One example aspect of the present disclosure relates to a method for scheduling a vehicle wash. The method can include receiving, at one or more computing devices, data indicative of an actual performance efficiency factor, wherein the data is collected from one or more sensors. The method can include determining, at the one or more computing devices, an expected performance efficiency factor based on a model. The method can include performing, at the one or more computing devices, a comparison of the actual performance efficiency factor with the expected performance efficiency factor. The method can include scheduling, at the one or more computing devices, the vehicle wash based on the comparison.

18 Claims, 5 Drawing Sheets

(51) Int. Cl.
 *G06Q 10/00* (2012.01)
 *G07C 5/00* (2006.01)
(58) Field of Classification Search
 CPC .... G07C 5/0808; G07C 5/0816; G07C 5/006; G06Q 10/0631; G06Q 10/06311; G06Q 10/06314; G06Q 10/06316; B08B 3/04; B64F 5/30
 See application file for complete search history.

(56) References Cited

U.S. PATENT DOCUMENTS

| | | | | |
|---|---|---|---|---|
| 4,654,087 A * | 3/1987 | Fujita | ............... | B64F 5/30 134/25.4 |
| 4,668,301 A * | 5/1987 | Takigawa | ............... | B64F 5/30 134/6 |
| 5,496,413 A * | 3/1996 | Phillips | ............... | C09G 1/04 134/42 |
| 6,304,194 B1 * | 10/2001 | McKillip | ............... | B64D 15/20 340/580 |
| 6,799,154 B1 | 9/2004 | Aragones et al. | | |
| 7,837,149 B2 | 11/2010 | Mackin | | |
| 8,583,463 B1 * | 11/2013 | Kalinowski | ............... | G07C 5/0808 705/28 |
| 9,174,745 B1 * | 11/2015 | Jimenez | ............... | G01C 23/00 |
| 9,505,484 B1 | 11/2016 | Al-Sabah | | |
| 2004/0249520 A1 * | 12/2004 | Maine | ............... | G01M 15/12 701/3 |
| 2006/0253268 A1 * | 11/2006 | Antoine | ............... | G06Q 10/063 702/184 |
| 2008/0027616 A1 * | 1/2008 | Zhang | ............... | F04D 27/02 701/99 |
| 2008/0257033 A1 * | 10/2008 | Roberts | ............... | B64D 15/20 73/170.26 |
| 2009/0280252 A1 * | 11/2009 | Armstrong | ............... | B05D 5/00 427/299 |
| 2011/0264408 A1 * | 10/2011 | Welch | ............... | G06Q 30/02 702/182 |
| 2011/0313614 A1 | 12/2011 | Hinnant, Jr. et al. | | |
| 2013/0268154 A1 * | 10/2013 | Kreitmair-Steck | ....... | B64F 5/60 701/29.1 |
| 2013/0311060 A1 * | 11/2013 | Smith | ............... | F01D 25/002 701/100 |
| 2015/0149135 A1 * | 5/2015 | Tervo | ............... | B63B 9/001 703/8 |
| 2015/0221225 A1 * | 8/2015 | Petersen | ............... | G06Q 10/04 701/120 |
| 2015/0307212 A1 * | 10/2015 | Petter | ............... | B64F 5/30 134/10 |
| 2016/0042576 A1 * | 2/2016 | Fischer | ............... | G05B 23/0283 701/29.4 |
| 2016/0121979 A1 * | 5/2016 | Asafuji | ............... | B63B 49/00 701/21 |
| 2016/0160679 A1 * | 6/2016 | Griffiths | ............... | B08B 3/003 134/57 R |
| 2016/0230592 A1 * | 8/2016 | Saenz | ............... | F01D 25/002 |
| 2017/0068253 A1 * | 3/2017 | Hedrick | ............... | G06F 17/30864 |
| 2018/0010481 A1 * | 1/2018 | Dauenhauer | ........... | B64D 31/00 |
| 2018/0155060 A1 * | 6/2018 | Dauenhauer | ........... | F01D 25/002 |
| 2018/0174078 A1 * | 6/2018 | Barakat | ............... | G06Q 10/02 |
| 2018/0273144 A1 * | 9/2018 | Skidmore | ............... | B63B 9/001 |
| 2018/0304969 A1 * | 10/2018 | Van Miert | ............... | B63J 99/00 |

FOREIGN PATENT DOCUMENTS

| | | | |
|---|---|---|---|
| DE | 102004051692 A1 * | 4/2006 | ............... B60S 1/08 |
| EP | 3 029 275 A1 | 6/2016 | |
| EP | 3042843 A1 * | 7/2016 | |
| KR | 1020140107981 A * | 9/2014 | |
| WO | WO2010/054132 A2 | 5/2010 | |
| WO | WO-2018/130905 A1 * | 7/2018 | |

OTHER PUBLICATIONS

Tanker Operator article, by Brian Warshaw, entitled "Hull cleaning is now a science", Oct. 2006, pp. 37-39 (Year: 2006).*
Longmuir, Mark et al., "Commercial aircraft exterior cleaning optimization", Journal of Aircraft, vol. 46 No. 1, Jan.-Feb. 2009, pp. 284-290 (Year: 2009).*
ATR, "APS to perform efficient operations", ATR Product Support & Services, Mar. 2012, p. 12 (Year: 2012).*
Kane, Daniel, "Developing a more fuel efficient tonnage through blasting of hulls and timely in-water husbandry", Ship Efficiency Conference, Hamburg, Sep. 23-24, 2013, 25 pages (Year: 2013).*
ATR, "Fuel Saving—Contributing to a sustainable air transport development", © ATR Customer Services, Feb. 2014, 33 pages (Year: 2014).*
EPO machine translation of KR 1020140107981 (original KR document published Sep. 5, 2014) (Year: 2014).*
Extended European Search Report and Opinion issued in connection with corresponding EP Application No. 18175324.5 dated Aug. 1, 2018.

* cited by examiner

VEHICLE WASH ASSESSMENT

FIELD

The present subject matter relates generally to an aerial vehicle.

BACKGROUND

Fuel cost can have a huge impact on an airline's profits. When an aerial vehicle is dirty, excess dirt on the aerial vehicle can cause excess drag, which can cause excess fuel to be used to reach the intended destination. A dirty aerial vehicle can be made aerodynamic, and therefore, more fuel efficient, with a wash. However, pulling an aerial vehicle out of operation for a wash has a cost to an airline as well. Currently, airlines have to guess as to if the tradeoff of taking an aerial vehicle out of operation for a wash outweighs the money lost from fuel inefficiencies for continued use of the aerial vehicle.

BRIEF DESCRIPTION

Aspects and advantages of embodiments of the present disclosure will be set forth in part in the following description, or may be learned from the description, or may be learned through practice of the embodiments.

One example aspect of the present disclosure relates to a method for scheduling a vehicle wash. The method can include receiving, at one or more computing devices, data indicative of an actual performance efficiency factor, wherein the data is collected from one or more sensors. The method can include determining, at the one or more computing devices, an expected performance efficiency factor based on a model. The method can include performing, at the one or more computing devices, a comparison of the actual performance efficiency factor with the expected performance efficiency factor. The method can include scheduling, at the one or more computing devices, the vehicle wash based on the comparison.

Another example aspect of the present disclosure relates to a system for scheduling a vehicle wash. The system can include a memory device. The system can include one or more processors. The one or more processors can be configured to monitor a plurality of differences between a detected performance efficiency factor and an expected performance efficiency factor. The one or more processors can be configured to monitor a plurality of differences between a detected performance efficiency factor and an expected performance efficiency factor. The one or more processors can be configured to determine a rate of change of the monitored plurality of differences over time. The one or more processors can be configured to compare the determined rate of change with a gradual threshold and a moderate threshold. When the determined rate of change is below the gradual threshold, the one or more processors can be configured to transmit a notification indicating that the vehicle is dirty. When the determined rate of change is at or above the gradual threshold and below the moderate threshold, the one or more processors can be configured to initiate an ice control procedure. When the determined rate of change is at or above the moderate threshold, the one or more processors can be configured to transmit an alert indicating a possible bird strike or a possible dent in the vehicle.

Other example aspects of the present disclosure are directed to systems, methods, aerial vehicles, avionics systems, devices, non-transitory computer-readable media for scheduling a vehicle wash. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
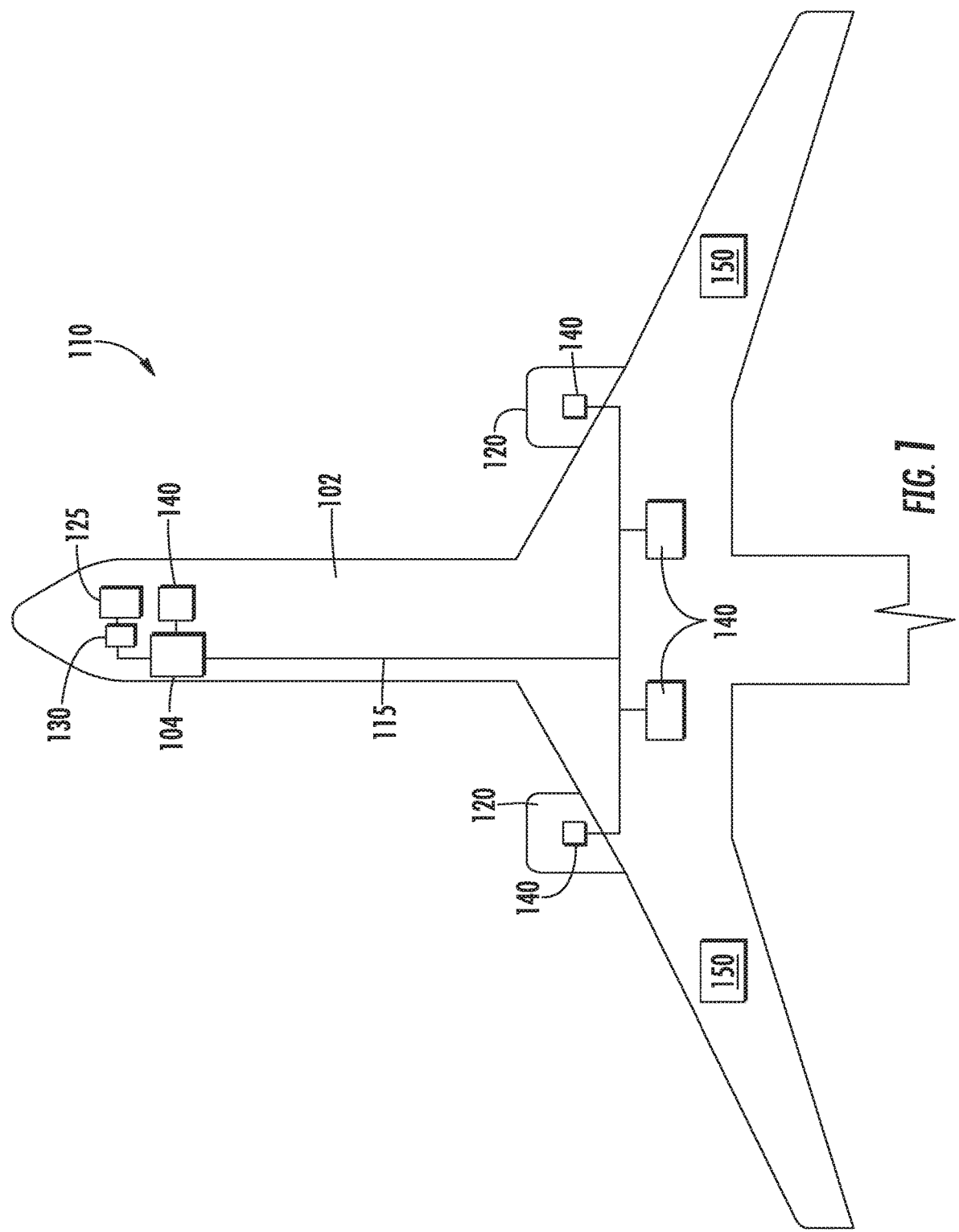
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

An aerial vehicle can include one or more sensors for detecting a performance efficiency factor, such as drag, on the aerial vehicle. Detected drag can increase thrust needed to move the aerial vehicle. In turn, the increased thrust can increase the fuel needed to move the aerial vehicle. Washing the aerial vehicle can remove dirt from an outer layer of the aerial vehicle. When the outer layer of the aerial vehicle has less dirt, the aerial vehicle can experience less drag during flight, and therefore be more fuel efficient.

The aerial vehicle can include a flight management system (FMS). The FMS can include a model. The model can determine an expected performance efficiency factor for the aerial vehicle. The FMS can receive signals from the one or more sensors indicative of the detected performance efficiency factor. The FMS can perform a comparison of the detected performance efficiency factor with the expected performance efficiency factor. When the detected performance efficiency factor exceeds the expected performance efficiency factor by more than a threshold, the FMS can generate a notification. For example, the threshold can be a point at which a difference between a cost of fuel associated with the detected performance efficiency factor and a cost of fuel associated with the expected performance efficiency factor is the same or more than a cost associated with washing the aerial vehicle.

In an aspect, a plurality of differences between a detected performance efficiency factor and an expected performance efficiency factor can be monitored. A rate of change of the monitored plurality of differences can be determined over time. When the rate of change is gradual, a notification to wash the aerial vehicle can be generated. When the rate of change is moderate, a notification of a possible buildup of ice can be generated. When the rate of change is sudden, an alert indicating a possible bird strike can be generated. Alternatively, an alert indicating a possible dent in the aerial vehicle can be generated when the rate of change is sudden.

In this way, the systems and methods according to example aspects of the present disclosure can have a number of technical effects and benefits. For instance, example aspects of the present disclosure have a technical effect of allowing each vehicle to track its own wash need and therefore reduce computational resources needed to track a wash schedule for a fleet of vehicle.

In some embodiments, the systems and methods of the present disclosure also provide an improvement to a computation system. For example, the systems and methods can receive, at one or more processors, at least one signal indicative of actual performance efficiency factor from one or more sensors; determine, at the one or more processors, an expected performance efficiency factor based on a model; perform, at the one or more processors, a comparison of the actual performance efficiency factor with the expected performance efficiency factor; and schedule, at the one or more processors, the vehicle wash based on the comparison. This can allow each vehicle to track its own wash need and reduce computational resources needed to track a wash schedule for a fleet of vehicles.

FIG. 1 depicts an example system for scheduling a vehicle wash according to example embodiments of the present disclosure. As shown, the system can include an aerial vehicle 102. The aerial vehicle 102 can include an onboard computing system 110. As shown in FIG. 1, the onboard computing system 110 can include one or more onboard computing device(s) 104 that can be associated with, for instance, an avionics system. One or more of the one or more onboard computing device(s) 104 can include a flight management system (FMS). One or more of the one or more onboard computing device(s) 104 can include a control system 400 as described in FIG. 4. The onboard computing device(s) 104 can be coupled to a variety of systems on the aerial vehicle 102 over a communications network 115. The communications network 115 can include a data bus or combination of wired and/or wireless communication links.

The onboard computing device(s) 104 can be in communication with a display system 125 including one or more display device(s) that can be configured to display or otherwise provide information generated or received by the system 110 to flight crew members of the aerial vehicle 102. The display system 125 can include a primary flight display, a multipurpose control display unit, or other suitable flight displays commonly included within a cockpit of the aerial vehicle 102.

The onboard computing device(s) 104 can also be in communication with a flight control computer 130. The flight control computer 130 can, among other things, automate the tasks of piloting and tracking the flight plan of the aerial vehicle 102. The flight control computer 130 can include or be associated with, any suitable number of individual microprocessors, power supplies, storage devices, interface cards, auto flight systems, flight management computers, a flight management system (FMS), a control system 400 as described in FIG. 4, and other standard components. The flight control computer 130 can include or cooperate with any number of software programs (e.g., flight management programs) or instructions designed to carry out the various methods, process tasks, calculations, and control/display functions necessary for operation of the aerial vehicle 102. The flight control computer 130 is illustrated as being separate from the onboard computing device(s) 104. Those of ordinary skill in the art, using the disclosures provided herein, will understand that the flight control computer 130 can also be included with or implemented by the onboard computing device(s) 104.

The onboard computing device(s) 104 can also be in communication with one or more aerial vehicle control system(s) 140. The aerial vehicle control system(s) 140 can be configured to perform various aerial vehicle operations and control various settings and parameters associated with the aerial vehicle 102. For instance, the aerial vehicle control system(s) 140 can be associated with one or more engine(s) 120 and/or other components of the aerial vehicle 102. The aerial vehicle control system(s) 140 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, a flight management system (FMS), a control system 400 as described in FIG. 4, and other systems. The aerial vehicle 102 can include one or more sensors 150 configured to sense a drag on the aerial vehicle 102.

The numbers, locations, and/or orientations of the components of example aerial vehicle 102 are for purposes of illustration and discussion and are not intended to be limiting. Those of ordinary skill in the art, using the disclosures provided herein, shall understand that the numbers, locations, and/or orientations of the components of the aerial vehicle 102 can be adjusted without deviating from the scope of the present disclosure.

Figure 2:
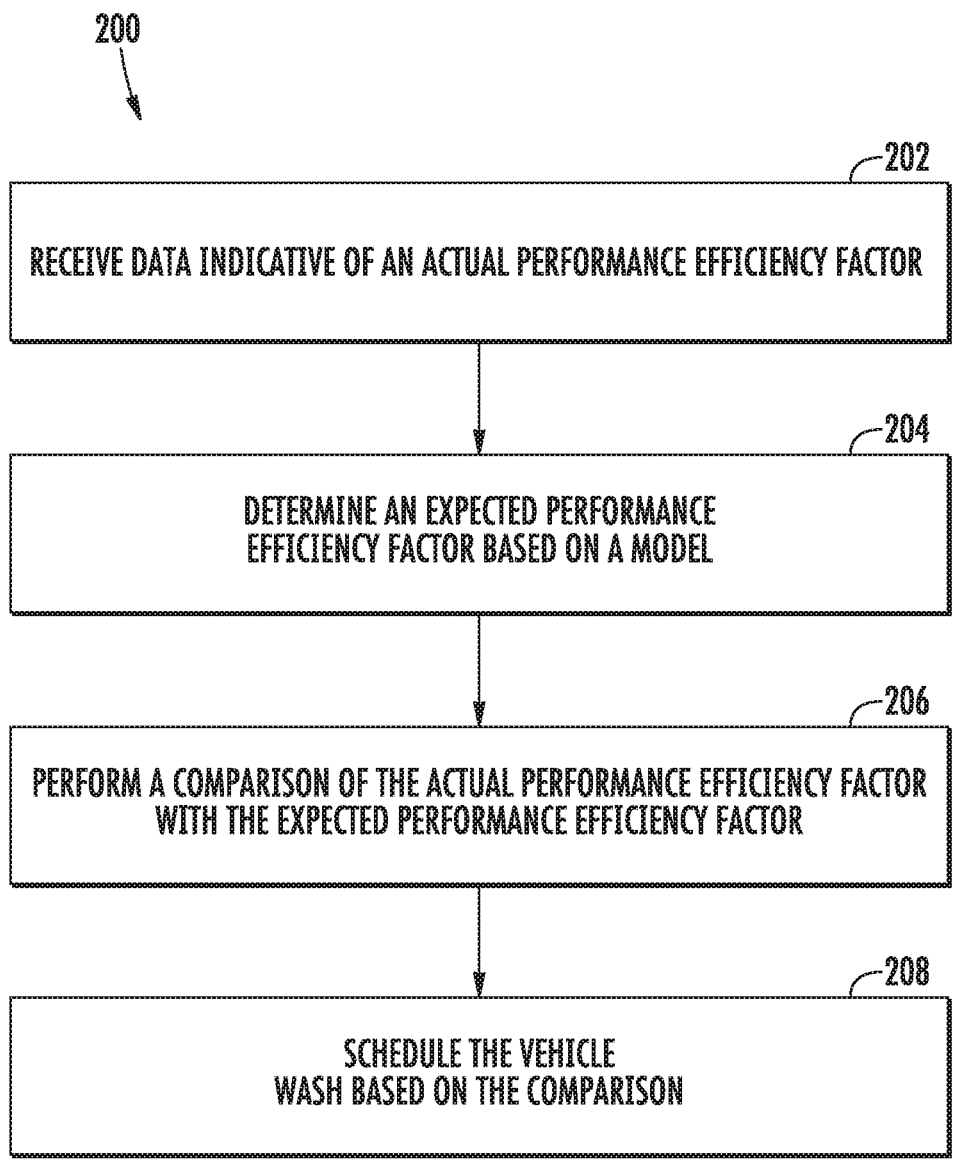
FIG. 2 depicts a flow diagram of an example method according to example embodiments of the present disclosure.

FIG. 2 depicts a flow diagram of an example method 200 for scheduling a vehicle wash. The method of FIG. 2 can be implemented using, for instance, the control system 400 of FIG. 4. The method of FIG. 2 can be implemented using, for instance, a flight management system (FMS). The method of FIG. 2 can be implemented using, for instance, a computer associated with a ground system. FIG. 2 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously or modified in various ways without deviating from the scope of the present disclosure.

At (202), data indicative of an actual performance efficiency factor can be received. For example, the control system 400 can receive data indicative of an actual performance efficiency factor. The data can be collected from one or more sensors. At least one signal related to a thrust force can be received. For example, the control system 400 can receive at least one signal related to a thrust force. In an embodiment, the actual performance efficiency factor can be calculated during a steady state based on an observed altitude, an observed airspeed, and the at least one signal related to a thrust force. In an embodiment, the actual performance efficiency factor can be calculated during a dynamic state based on an observed rate of drop of altitude, an observed rate of drop in airspeed, and the at least one signal related to a thrust force, wherein the at least one signal related to a thrust force indicates a reduction of throttle. The at least one signal related to a thrust force can include one or more signals indicating one or more of an engine power setting, an engine N1 value, an engine N2 value, an engine pressure ratio (EPR) value, a temperature value, a fuel flow value, etc.

At (204), an expected performance efficiency factor can be determined based on a model. For example, the control system 400 can determine an expected performance efficiency factor based on a model. The model can output the expected performance efficiency factor based on historical data. In an embodiment, the model can output expected values for one or more of a thrust force, an altitude, and an airspeed based on historical data. For example, in a steady state, the model can predict a thrust force for an observed altitude and an observed airspeed. In other embodiments, the model can predict an airspeed for an observed thrust force and an observed altitude. In other embodiments, the model can predict an altitude for an observed thrust force and an observed airspeed. In an embodiment, the model can output expected values for rates of change for one or more of a thrust force, an altitude, and an airspeed based on historical data. For example, in a dynamic state, the model can predict a reduction in throttle for an observed rate of drop of altitude and an observed rate of drop of airspeed. In other embodiments, the model can predict a rate of drop of airspeed for an observed reduction in throttle and an observed rate of drop in altitude. In other embodiments, the model can predict a rate of drop in altitude for an observed throttle reduction and an observed rate of drop in airspeed.

At (206), a comparison of the actual performance efficiency factor with the expected performance efficiency factor can be performed. For example, the control system 400 can perform a comparison of the actual performance efficiency factor with the expected performance efficiency factor. At (208), the vehicle wash can be scheduled based on the comparison. For example, the control system 400 can schedule the vehicle wash based on the comparison. In an embodiment, a vehicle wash interval can be scheduled based on the comparison. For example, the control system 400 can schedule a vehicle wash interval based on the comparison.

Figure 3:
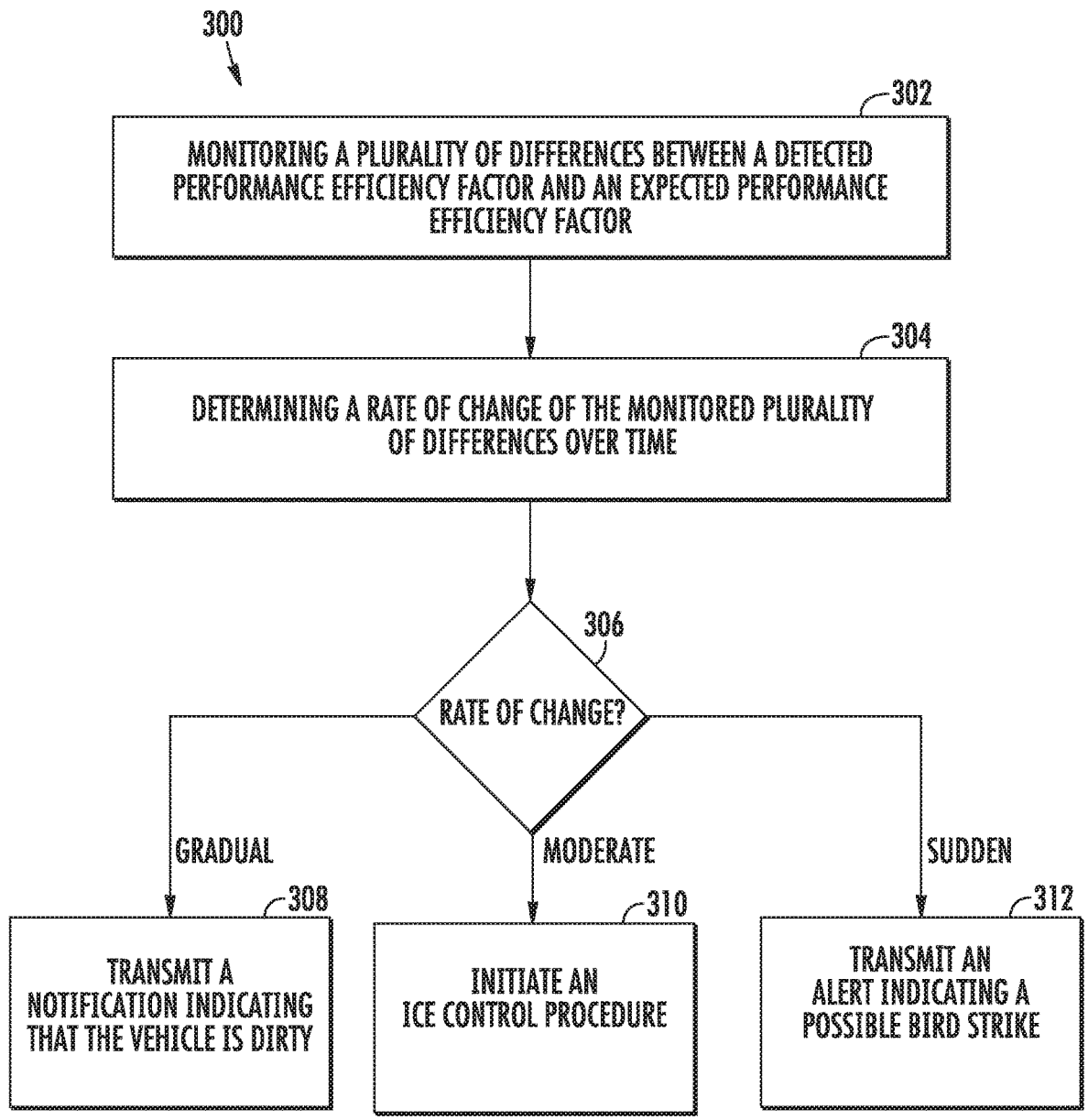
FIG. 3 depicts a flow diagram of an example method according to example embodiments of the present disclosure.

FIG. 3 depicts a flow diagram of an example method 300 for scheduling a vehicle wash. The method of FIG. 3 can be implemented using, for instance, the control system 400 of FIG. 4. FIG. 3 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously or modified in various ways without deviating from the scope of the present disclosure.

At (302), a plurality of differences between a detected performance efficiency factor and an expected performance efficiency factor can be monitored. For example, the control system 400 can monitor a plurality of differences between a detected performance efficiency factor and an expected performance efficiency factor.

At (304), a rate of change of the monitored plurality of differences over time can be determined. For example, the control system 400 can determine a rate of change of the monitored plurality of differences over time.

At (306), the determined rate of change can be compared to one or more thresholds. For example, the control system 400 can compare the determined rate of change to one or more thresholds. In an embodiment, if the determined rate of change is below a gradual threshold, then the method 300 can move to (308). In another embodiment, if the determined rate of change is below or at the gradual threshold, then the method 300 can move to (308). In an embodiment, a moderate range can include a range between the gradual threshold and a sudden threshold, endpoints inclusive. In another embodiment, a moderate range can include a range between the gradual threshold and a sudden threshold, endpoints exclusive. In yet another embodiment, a moderate range can include a range between the gradual threshold and a sudden threshold, wherein one of the gradual threshold and the sudden threshold is included in the moderate range. If the determined rate of change falls within the moderate range, then the method 300 can move to (310). In an embodiment, if the determined rate of change is above the sudden threshold, then the method 300 can move to (312). In another embodiment, if the determined rate of change is above or at the sudden threshold, then the method 300 can move to (312).

At (308), a notification indicating that the vehicle is dirty can be transmitted. For example, the control system 400 can transmit a notification indicating that the vehicle is dirty to a computing device to display to an operator of the vehicle. As another example, the control system 400 can transmit a notification indicating that the vehicle is dirty to a ground computing system. At (310), an ice control procedure can be initiated. For example, the control system 400 can initiate an ice control procedure. At (312), an alert indicating a possible bird strike can be transmitted. For example, the control system 400 can transmit an alert indicating a possible bird strike to a computing device to display to an operator of the vehicle. As another example, the control system 400 can transmit an alert indicating a possible bird strike to a ground computing system. Optionally, at (312), an alert indicating a possible dent in the vehicle can be transmitted. For example, the control system 400 can transmit an alert indicating a possible dent in the vehicle to a computing device to display to an operator of the vehicle. As another example, the control system 400 can transmit an alert indicating a possible dent in the vehicle to a ground computing system.

Figure 4:
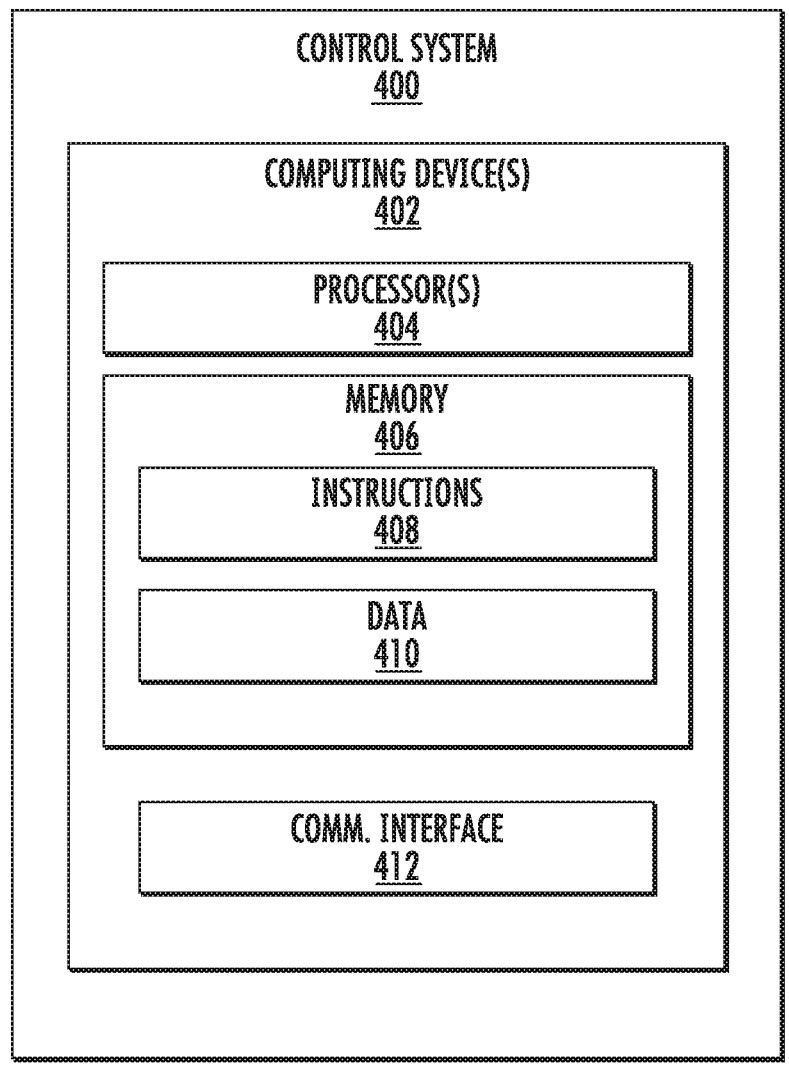
FIG. 4 depicts a control system for implementing one or more aspects according to example embodiments of the present disclosure.

FIG. 4 depicts a block diagram of an example control system 400 that can be used to implement methods and systems according to example embodiments of the present disclosure. As shown, the control system 400 can include one or more computing device(s) 402. The one or more computing device(s) 402 can include one or more processor(s) 404 and one or more memory device(s) 406. The one or more processor(s) 404 can include any suitable processing device, such as a microprocessor, microcontroller, integrated circuit, logic device, or other suitable processing device. The one or more memory device(s) 406 can include one or more computer-readable media, including, but not limited to, non-transitory computer-readable media, RAM, ROM, hard drives, flash drives, or other memory devices.

The one or more memory device(s) 406 can store information accessible by the one or more processor(s) 404, including computer-readable instructions 408 that can be executed by the one or more processor(s) 404. The instructions 408 can be any set of instructions that when executed by the one or more processor(s) 404, cause the one or more processor(s) 404 to perform operations. The instructions 408 can be software written in any suitable programming language or can be implemented in hardware. In some embodiments, the instructions 408 can be executed by the one or more processor(s) 404 to cause the one or more processor(s) 404 to perform operations, such as the operations for scheduling a vehicle wash, as described with reference to FIG. 2 and/or FIG. 3. In some embodiments, the instructions can be executed by the one or more processor(s) 404 to cause the one or more processor(s) to perform flight management system (FMS) operations.

The memory device(s) 406 can further store data 410 that can be accessed by the one or more processor(s) 404. For example, the data 410 can include any data used for scheduling a vehicle wash, as described herein. The data 410 can include one or more table(s), function(s), algorithm(s), model(s), equation(s), etc. for scheduling a vehicle wash according to example embodiments of the present disclosure.

The one or more computing device(s) 402 can also include a communication interface 412 used to communicate, for example, with the other components of system. The communication interface 412 can include any suitable components for interfacing with one or more network(s), including for example, transmitters, receivers, ports, controllers, antennas, or other suitable components.

Figure 5:
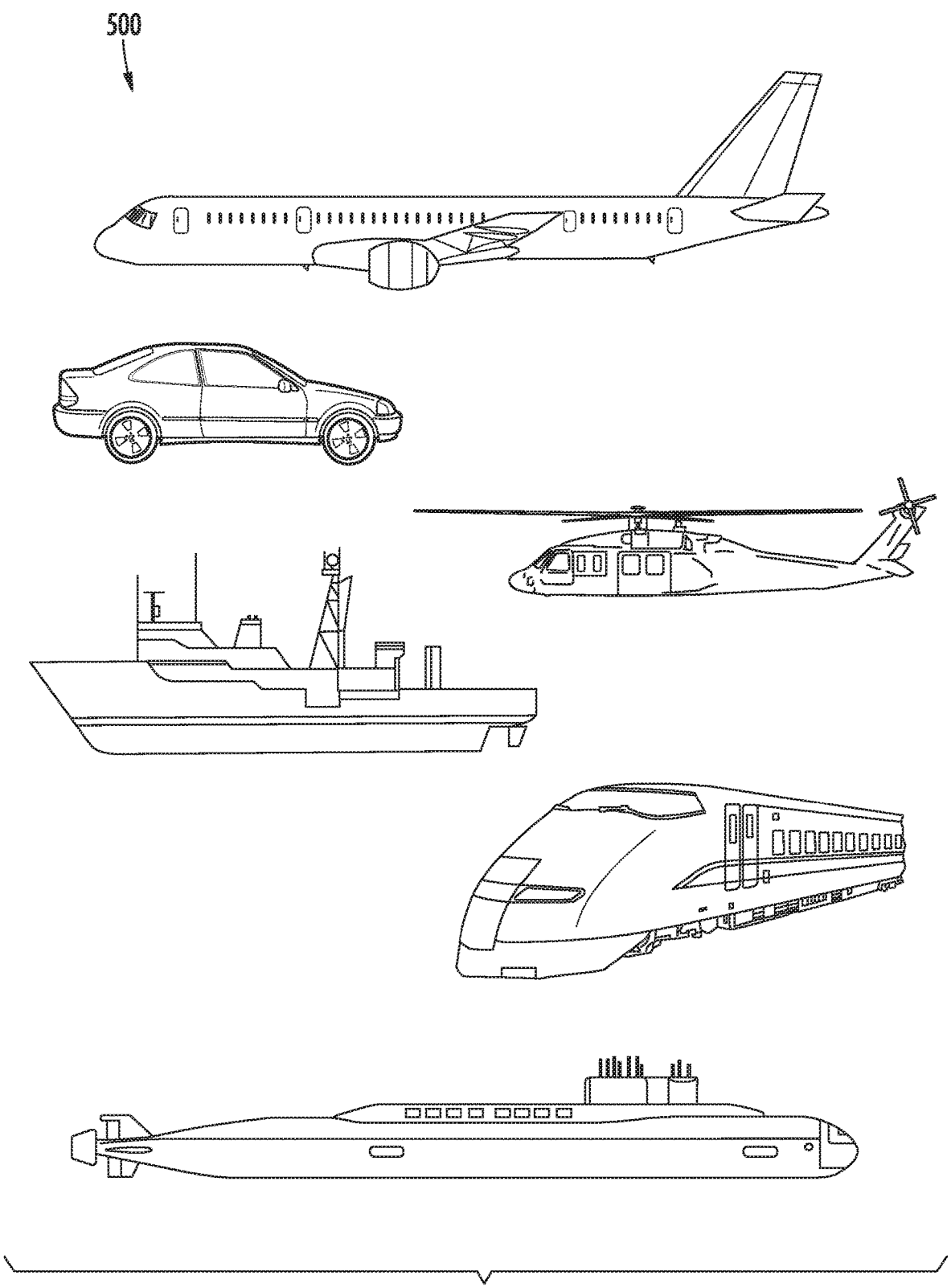
FIG. 5 depicts example vehicles according to example embodiments of the present disclosure.

Referring now to FIG. 5, example vehicles 500 according to example embodiments of the present disclosure are depicted. The systems and methods of the present disclosure can be implemented on an aerial vehicle, helicopter, automobile, boat, submarine, train, and/or any other suitable vehicles. While the present disclosure is described herein with reference to an aerial vehicle implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for scheduling a vehicle wash comprising:
   receiving, at one or more computing devices, data indicative of an actual performance efficiency factor, wherein the data is collected from one or more sensors;
   determining, at the one or more computing devices, an expected performance efficiency factor based on a model;
   performing, at the one or more computing devices, a comparison of the actual performance efficiency factor with the expected performance efficiency factor;
   monitoring, at the one or more computing devices, a plurality of differences between a detected performance efficiency factor and the expected performance efficiency factor;
   determining, at the one or more computing devices, a rate of change of the monitored plurality of differences over time;
   determining, at the one or more computing devices, that the determined rate of change is above a threshold;
   initiating, at the one or more computing devices, a control procedure or transmitting, at the one or more computing devices, an alert in response to determining that the determined rate of change is above the threshold; and
   scheduling, at the one or more computing devices, the vehicle wash based on the comparison.

2. The method of claim 1, wherein scheduling, at the one or more computing devices, the vehicle wash based on the comparison further comprises scheduling, at the one or more computing devices, a vehicle wash interval based on the comparison.

3. The method of claim 1, wherein at least one of the one or more computing devices comprises a flight management system (FMS).

4. The method of claim 1, wherein at least one of the one or more computing devices comprises a computing device associated with a ground system.

5. The method of claim 1, wherein receiving, at one or more computing devices, data indicative of an actual performance efficiency factor further comprises:
   receiving, at the one or more computing devices, at least one signal related to a thrust force; and
   determining, at the one or more computing devices, the actual performance efficiency factor based on the signal.

6. The method of claim 1, wherein the model outputs the expected performance efficiency factor based on historical data.

7. The method of claim 1, further comprising:
   determining, at the one or more computing devices, that the determined rate of change is at or below a gradual threshold; and
   transmitting, at the one or more computing devices, a notification indicating that the vehicle is dirty.

8. The method of claim 1, wherein determining, at the one or more computing devices, that the determined rate of change is above the threshold comprises determining, at the one or more computing devices, that the determined rate of change is above a gradual threshold and at or below a moderate threshold; and wherein initiating, at the one or more computing devices, the control procedure or transmitting, at the one or more computing devices, the alert comprises initiating, at the one or more computing devices, an ice control procedure.

9. The method of claim 1, wherein determining, at the one or more computing devices, that the determined rate of change is above the threshold comprises determining, at the one or more computing devices, that the determined rate of change is above a moderate threshold; and wherein initiating, at the one or more computing devices, the control procedure or transmitting, at the one or more computing devices, the alert comprises transmitting, at the one or more computing devices, an alert indicating a possible bird strike or a possible dent in the vehicle.

10. A system for scheduling a vehicle wash comprising:
a memory device; and
one or more processors configured to:
   monitor a plurality of differences between a detected performance efficiency factor and an expected performance efficiency factor;
   determine a rate of change of the monitored plurality of differences over time;
   compare the determined rate of change with a gradual threshold and a moderate threshold;
   when the determined rate of change is below the gradual threshold, transmit a notification indicating that the vehicle is dirty;
   when the determined rate of change is at or above the gradual threshold and below the moderate threshold, initiate an ice control procedure; and
   when the determined rate of change is at or above the moderate threshold, transmit an alert indicating a possible bird strike or a possible dent in the vehicle.

11. The system of claim 10, wherein at least one of the one or more processors comprises a flight management system (FMS).

12. An aerial vehicle comprising:
a memory device; and
one or more computing devices configured to:
   receive data indicative of an actual performance efficiency factor, wherein the data is collected from one or more sensors;
   determine an expected performance efficiency factor based on a model;
   perform a comparison of the actual performance efficiency factor with the expected performance efficiency factor;
   monitor a plurality of differences between a detected performance efficiency factor and the expected performance efficiency factor;
   determine a rate of change of the monitored plurality of differences over time;
   determine that the determined rate of change is above a threshold;
   initiate a control procedure or transmit an alert in response to determining that the determined rate of change is above the threshold; and
   schedule the vehicle wash based on the comparison.

13. The aerial vehicle of claim 12, wherein the one or more computing devices are further configured to schedule a vehicle wash interval based on the comparison.

14. The aerial vehicle of claim 12, wherein at least one of the one or more computing devices comprises a flight management system (FMS).

15. The aerial vehicle of claim 12, wherein at least one of the one or more computing devices comprises a computing device associated with a ground system.

16. The aerial vehicle of claim 12, wherein the one or more computing devices are further configured to:
   receive at least one signal related to a thrust force; and
   determine the actual performance efficiency factor based on the signal.

17. The aerial vehicle of claim 12, wherein the model outputs the expected performance efficiency factor based on historical data.

18. The aerial vehicle of claim 12, wherein in determining that the determined rate of change is above the threshold the one or more computing devices is configured to determine that the determined rate of change is at or below a gradual threshold; and wherein in initiating the control procedure or transmitting the alert the one or more computing devices is configured to transmit a notification indicating that the vehicle is dirty.

* * * * *